(12) United States Patent
Iyer et al.

(10) Patent No.: US 12,108,187 B2
(45) Date of Patent: Oct. 1, 2024

(54) SEAMLESS SWITCHING OF AUDIO AND/OR VIDEO DEVICES FOR COLLABORATION APPLICATIONS

(71) Applicant: Dell Products, L.P., Round Rock, TX (US)

(72) Inventors: Vivek Viswanathan Iyer, Saint Johns, FL (US); Srinivasa Ragavan, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 25 days.

(21) Appl. No.: 17/805,473

(22) Filed: Jun. 6, 2022

(65) Prior Publication Data

US 2023/0396732 A1    Dec. 7, 2023

(51) Int. Cl.
*H04N 7/14* (2006.01)

(52) U.S. Cl.
CPC ............. *H04N 7/147* (2013.01); *H04N 7/142* (2013.01)

(58) Field of Classification Search
CPC ................................. H04N 7/147; H04N 7/142
See application file for complete search history.

(56) References Cited

U.S. PATENT DOCUMENTS

| | | | | |
|---|---|---|---|---|
| 6,453,336 B1* | 9/2002 | Beyda | ................. | H04L 65/4046 709/224 |
| 9,237,307 B1* | 1/2016 | Vendrow | ................. | H04N 7/152 |
| 2021/0051298 A1* | 2/2021 | Atkins | ................... | H04N 7/147 |

* cited by examiner

*Primary Examiner* — Amal S Zenati
(74) *Attorney, Agent, or Firm* — Fogarty LLP

(57) ABSTRACT

Systems and methods for providing seamless switching of audio and/or video devices for collaboration applications are described. In an embodiment, an Information Handling System (IHS) may include a processor and a memory coupled to the processor, the memory having program instructions stored thereon that, upon execution, cause the IHS to: receive, during a collaboration session facilitated by a collaboration application, an indication of an event, where the collaboration application is configured to receive audio or video data from an audio or video device via a device handle; and in response to the event, map a different audio or video device to the device handle, where the collaboration application is configured to receive additional audio or video data from the different audio or video device via the device handle.

20 Claims, 4 Drawing Sheets

SEAMLESS SWITCHING OF AUDIO AND/OR VIDEO DEVICES FOR COLLABORATION APPLICATIONS

FIELD

This disclosure relates generally to Information Handling Systems, and, more specifically, to systems and methods for providing seamless switching of audio and/or video devices for collaboration applications.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Systems and methods for providing seamless switching of audio and/or video devices for collaboration applications are described. In an illustrative, non-limiting embodiment, an Information Handling System (IHS) may include a processor and a memory coupled to the processor, the memory having program instructions stored thereon that, upon execution, cause the IHS to: receive, during a collaboration session facilitated by a collaboration application, an indication of an event, where the collaboration application is configured to receive audio or video data from an audio or video device via a device handle; and in response to the event, map a different audio or video device to the device handle, where the collaboration application is configured to receive additional audio or video data from the different audio or video device via the device handle.

The collaboration application may include an audio or video conferencing application. The audio or video device may include at least one of: an integrated camera or an external camera. Additionally, or alternatively, the audio or video device may include at least one of: an integrated microphone, an external microphone, an integrated speaker, or an external speaker. The different audio or video device may be mapped to the device handle by an Operating System (OS) service external to the collaboration application.

In some cases, the different audio or video device may be mapped to the device handle in the absence of notification to the collaboration application. Additionally, or alternatively, the different audio or video device may be mapped to the device handle in the absence of any user input request.

The event may include a connectivity issue between the audio or video device and the IHS. The connectivity issue may include a loss of at least a portion of a video frame or a loss of at least a portion of an audio stream during the collaboration session. The program instructions, upon execution, may cause the IHS to select the different audio or video device based, at least in part, upon a user's preference.

The event may include an IHS docking or undocking. The event may include a at least one of: an unplugging of the audio or video device from the IHS or a plugging of the different audio or video device into the IHS. The event may include a power or battery event. The event may include a change in utilization of a component of the IHS. The event may include at least one of: a change of location of the IHS, a change of position of a user relative to the IHS, a change of position of the user relative to the audio or video device, a change of position of the user relative to the different audio or video device, or a change in the user's gaze or face angle. The event may also include a change of a role of a user during the collaboration session.

In another illustrative, non-limiting embodiment, a method may include: receiving an indication of a failure of an audio or video device during a collaboration session executed by a collaboration application, where the collaboration application is configured to receive audio or video data from the audio or video device using a device handle; and in response to the failure, mapping a different audio or video device to the device handle without notifying the collaboration application, where the collaboration application is configured to receive additional audio or video data from the different audio or video device using the device handle. The failure may include a loss of at least a portion of a video frame or a loss of at least a portion of an audio stream during the collaboration session.

In another illustrative, non-limiting embodiment, a memory storage device having program instructions stored thereon that, upon execution by an IHS, cause the IHS to: receive an indication of a change of context during a collaboration session provided by a collaboration application, where the collaboration application is configured to receive audio or video data from an audio or video device using a device handle; and in response to the change of context, map a different audio or video device to the device handle without notification to the collaboration application, where the collaboration application is configured to receive additional audio or video data from the different audio or video device using the device handle. The change of context may include at least one of: a change of position of a user relative to the IHS, a change of position of the user relative to the audio or video device, a change of position of the user relative to the different audio or video device, or a change in the user's gaze or face angle.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
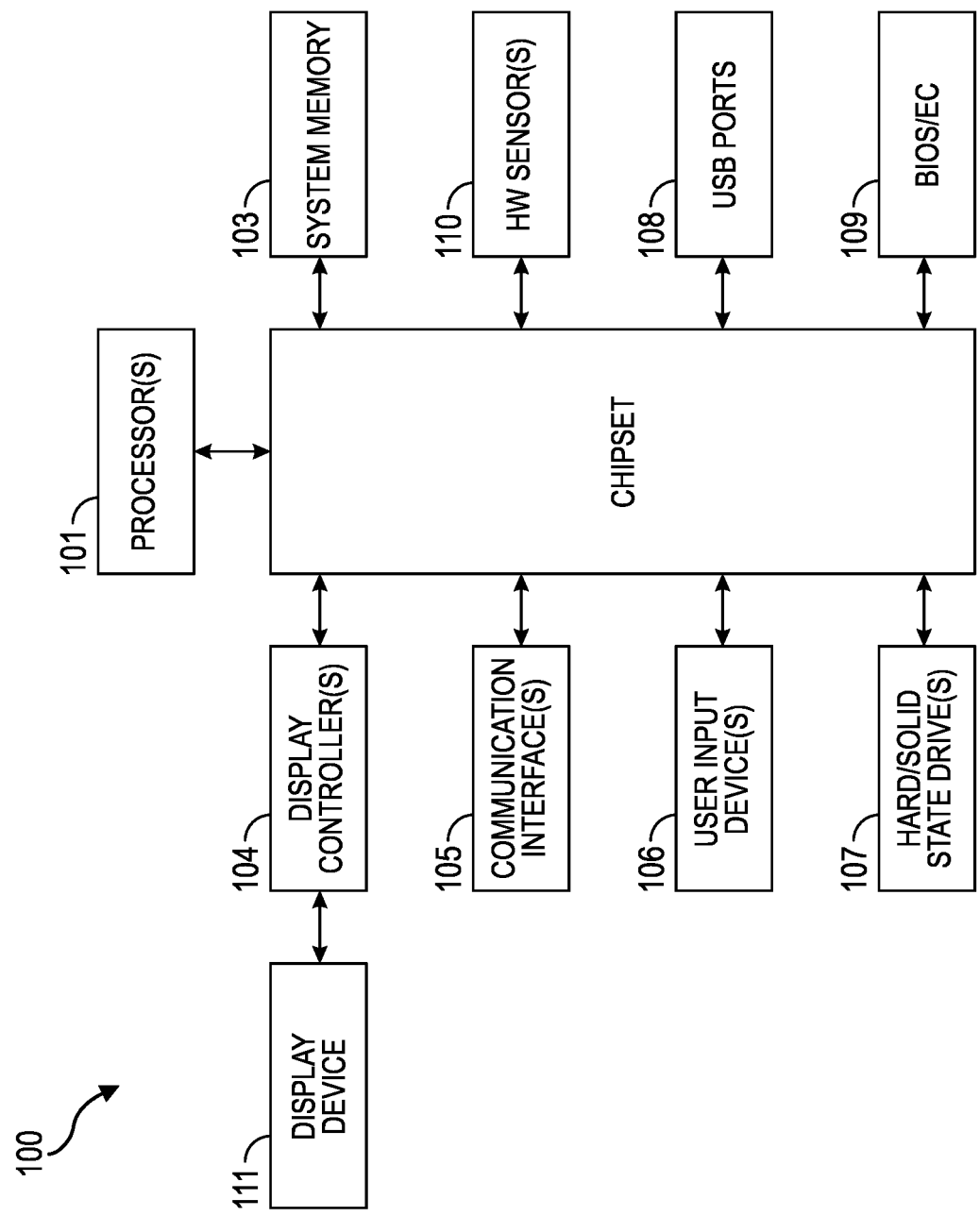
FIG. 1 depicts a block diagram of examples of components of an Information Handling System (IHS), according to some embodiments.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include random access memory (RAM), one or more processing resources such as a central processing unit (CPU) or hardware or software control logic, ROM, and/or other types of nonvolatile memory. Additional components of an IHS may include one or more disk drives, one or more network ports for communicating with external devices as well as various input and output (I/O) devices, such as a keyboard, a mouse, touchscreen and/or a video display. An IHS may also include one or more buses operable to transmit communications between the various hardware components. A more detailed example of an IHS is described with respect to FIG. 1. It should be appreciated that although certain embodiments are discussed in the context of a personal computing device, other embodiments may utilize other types of IHSs.

In modern enterprises, the term "hoteling" (or "office hoteling"), shared workspaces, or co-working spaces collectively refer to physical environments where clients, users, or employees can schedule their hourly, daily, or weekly use of individual spaces, such as office desks, cubicles, or conference rooms—thus serving as an alternative to conventional, permanently assigned seating. In some cases, hoteling clients, users, or employees access a reservation system to book an individual space (e.g., a desk, a cubicle, a conference room, an office, etc.) before they arrive at work, which gives them freedom and flexibility to work wherever they want to. In other cases, individual spaces may also be available to users without a reservation system on a first-come, first-serve basis (e.g., in the lobby of a hotel or in a library).

Each individual space may include its own set of audio and/or video (A/V) peripheral devices (e.g., an external camera or webcam, an external microphone, an external speaker, etc.). When a client, user, or employee reaches an individual space, they bring their own IHSs and choose between using the A/V devices integrated into their IHS or external A/V devices found in that space.

As such, users typically connect to different A/V devices each workday, particularly when executing collaboration applications, such as audio or video conferencing applications (e.g., ZOOM, TEAMS, etc.), or the like. For example, a user may employ a BLUETOOTH (BT) speaker with integrated microphone and webcams when in a home environment, a BT headset with an external webcam in a cubicle environment, or a BT headset with integrated webcam when working from anywhere else. In different work environments, different combinations of devices may be available to the user (e.g., external webcam, integrated webcam, integrated speaker and microphone, external speaker and microphone, wireless headset, etc.).

In some cases, when a client, user, or employee arrives at a particular workspace, their IHS may be coupled to one or more A/V peripheral devices via a Workspace Managing Device (WMD) such as a dock, docking station, intelligent hub, external display, wireless KVM, or other IHS. Additionally, or alternatively, the IHS may be directly coupled to one or more A/V peripheral devices using any suitable wireless communication protocol (e.g., BT, BT LOW ENERGY or "BLE," ZIGBEE, Z-WAVE, WI-FI, WI-FI DIRECT, etc.). Additionally, or alternatively, a workspace may be served by one of a plurality of distributed Access Points (APs) for network/Internet connectivity, such as wireless routers or the like.

In most situations, however, if a user attempts to switch between A/V devices during a collaboration session, whether on purpose or inadvertently (e.g., by undocking in the middle of conference call), A/V device failures can lead to undesirable behaviors, such as audio disconnect, video disconnect, call disconnect, video freeze, application freeze, etc. Generally, conventional collaboration applications use a fixed device configuration and do not support seamless switching of A/V devices based upon A/V device failures, context changes, and/or user preferences during a collaboration session.

For example, conventional collaboration applications do not allow a user to switch between integrated and external webcams for better video quality (e.g., position, angle, lighting, etc.) or between integrated and external audio devices for better audio quality (e.g., external noise suppression, microphone reception, etc.) during a collaboration session. There is no mechanism to adaptively switch A/V devices based upon a user's gaze or face angle during a collaboration session. There is also no mechanism to seamlessly switch between A/V devices in response to device malfunction, connectivity issues, or other failures during a collaboration session.

For example, in a first hypothetical scenario, a user may plug a new A/V device into an IHS during a collaboration session to provide better A/V quality. The user may start a video conference call with an integrated webcam, speaker, and microphone. During the call, in response to audio volume issues, the user may wish to switch from the integrated audio device(s) to wireless headphones. Also, to improve video quality, the user may wish to switch from the integrated webcam to the newly plugged-in webcam, which provides better video features (e.g., digital pan-tilt-zoom). In some cases, which A/V device(s) are selected at any given time may depend on the user's context (e.g., identity or type of IHS, application(s) being executed, whether the collaboration application is being executed in the foreground or in the background, A/V devices available, etc.).

In a second hypothetical scenario, a user may need to switch between A/V devices in response to a device's malfunctioning, disconnection, or failure. For example, the user may start a video conference call with an external webcam and external speakerphone wired into the user's IHS. During the session, the IHS may encounter a connection failure resulting in all external A/V devices being disconnected. In that case, the user may want the collaboration session to use integrated A/V devices as a fallback, rather than having the session disconnect completely. Alternatively, if the battery of a wireless audio device being used during a session is low, a seamless switching to the integrated audio device would be beneficial.

To address these, and other concerns, systems and methods described herein may enable seamless switching of audio and/or video devices for collaboration applications. In various implementations, these systems and methods may provide an IHS, Operating System or "OS" (e.g., WINDOWS, MACOS, iOS, ANDROID, LINUX, etc.), A/V device, and Independent Software Vendor (ISV)-agnostic architectural framework to handle A/V device failures and to ensure a predictable behavior for the user by seamlessly switching to user-preferred devices without affecting ongoing collaboration sessions.

These systems and methods may include a virtual camera driver, virtual camera control points, and an A/V shim layer that handles device failures and transitions AV devices seamlessly. The A/V shim layer may monitor and detect device failures, and it may switch and associate appropriate physical A/V devices with corresponding virtual handles, thereby ensuring a seamless transition without collaboration applications having to be made aware of the failures or context changes. As such, these systems and methods enable predictable behavior and allow users to have seamless switching of A/V devices during a collaboration session without otherwise burdening the session.

FIG. 1 is a block diagram of components of IHS 100, according to some embodiments. As depicted, IHS 100 includes processor 101. In various embodiments, IHS 100 may be a single-processor system, or a multi-processor system including two or more processors. Processor 101 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 102 coupled to processor 101. Chipset 102 may provide processor 101 with access to several resources. In some cases, chipset 102 may utilize a QuickPath Interconnect (QPI) bus to communicate with processor 101. Chipset 102 may also be coupled to communication interface(s) 105 to enable communications between IHS 100 and various wired and/or wireless networks, such as Ethernet, WiFi, BT, cellular or mobile networks (e.g., CDMA, TDMA, LTE, etc.), satellite networks, or the like. In some cases, communication interface(s) 105 may be used to communicate with A/V devices (e.g., BT speakers, microphones, headsets, etc.). Moreover, communication interface(s) 105 may be coupled to chipset 102 via a PCIe bus.

Chipset 102 may be coupled to display controller(s) 104, which may include one or more or graphics processor(s) (GPUs) on a graphics bus, such as an Accelerated Graphics Port (AGP) or Peripheral Component Interconnect Express (PCIe) bus. As shown, display controller(s) 104 provide video or display signals to display device 111. In other implementations, any number of display controllers or display devices may be used.

Display device 111 may include Liquid Crystal Display (LCD), Light Emitting Diode (LED), organic LED (OLED), or other thin film display technologies. Display device 111 may include a plurality of pixels arranged in a matrix, configured to display visual information, such as text, two-dimensional images, video, three-dimensional images, etc. In some cases, display device 111 may be provided as a single continuous display, rather than two discrete displays.

Chipset 102 may provide processor 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like. Memory 103 may store program instructions that, upon execution by processor 101, enable a collaboration mode for a touchpad coupled or integrated into IHS 100.

Chipset 102 may also provide access to one or more hard disk and/or solid-state drives 107. In certain embodiments, chipset 102 may also provide access to one or more optical drives or other removable-media drives. In certain embodiments, chipset 102 may also provide access to one or more USB ports 108, to which one or more A/V peripheral devices may be coupled (e.g., internal or external webcams, microphones, speakers, etc.).

Chipset 102 may further provide access to one or more user input devices 106, for example, using a super I/O controller or the like. Examples of user input devices 106 include, but are not limited to, a keyboard, mouse, touchpad, stylus or active pen, totem, etc. Each of user input devices 106 may include a respective controller (e.g., a touchpad may have its own touchpad controller) that interfaces with chipset 102 through a wired or wireless connection (e.g., via communication interfaces(s) 105).

In certain embodiments, chipset 102 may also provide an interface for communications with one or more hardware (HW) sensors 110. Sensors 110 may be disposed on or within the chassis of IHS 100, and may include, but are not limited to: electric, magnetic, radio, optical, infrared, thermal, force, pressure, acoustic, ultrasonic, proximity, position, deformation, bending, direction, movement, velocity, rotation, and/or acceleration sensor(s).

Upon booting of IHS 100, processor(s) 101 may utilize Basic Input/Output System (BIOS) instructions of BIOS/Embedded Controller (EC) 109 to initialize and test hardware components coupled to IHS 100 and to load an OS for use by IHS 100. BIOS 109 provides an abstraction layer that allows the OS to interface with certain hardware components that are utilized by IHS 100. Via the hardware abstraction layer provided by BIOS 109, software stored in system memory 103 and executed by processor 101 can interface with certain I/O devices that are coupled to IHS 100. The Unified Extensible Firmware Interface (UEFI) was designed as a successor to BIOS. As a result, many modern IHSs utilize UEFI in addition to or instead of a BIOS. As used herein, BIOS 109 is intended to also encompass a UEFI component.

EC 109 may be installed as a Trusted Execution Environment (TEE) component to the motherboard of IHS 100. EC 109 may implement operations for interfacing with a power adapter in managing power for IHS 100. Such operations may be utilized to determine the power status of IHS 100, such as whether IHS 100 is operating from battery power or is plugged into an AC power source. Firmware instructions utilized by EC 109 may be used to provide various core operations of IHS 100, such as power management and management of certain modes of IHS 100 (e.g., turbo modes, maximum operating clock frequencies of certain components, etc.).

In some implementations, a low-power mode of operation may include the S0 low-power idle model, also known as Modern Standby or Connected Standby, which provides an instant on/off user experience and maintains a network connection for certain processes while consuming very little power. These power modes may be entered, for example, when IHS 100 transitions into standby (e.g., "sleep," etc.).

EC 109 may also implement operations for detecting certain changes to the physical configuration or posture of IHS 100 and managing the modes of a touchpad or other user input device 106 in different configurations of IHS 100. For instance, where IHS 100 as a 2-in-1 laptop/tablet form factor, EC 109 may receive inputs from a lid position or hinge angle sensor 110, and it may use those inputs to determine: whether the two sides of IHS 100 have been latched together to a closed position or a tablet position, the magnitude of a hinge or lid angle, etc.

EC 109 may be further configured to calculate hashes or signatures that uniquely identify individual components of IHS 100. In such scenarios, EC 109 may calculate a hash value based on the configuration of a hardware and/or software component coupled to IHS 100. For instance, EC 109 may calculate a hash value based on all firmware and other code or settings stored in an onboard memory of a hardware component. Such hash values may be calculated as part of a trusted process of manufacturing IHS 100 and may be maintained in secure storage as a reference signature. EC 109 may later recalculate the hash value for a component may compare it against the reference hash value to determine if any modifications have been made to the component, thus indicating that the component has been compromised. In this manner, EC 109 may validate the integrity of hardware and software components installed on IHS 100.

In other embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components. For example, all or a portion of the operations executed by the illustrated components may instead be provided by components integrated into processor(s) 101 as systems-on-a-chip (SoC). As such, in certain embodiments, IHS 100 may be implemented as different classes of computing devices including, but not limited to: servers, workstations, desktops, laptops, appliances, video game consoles, tablets, smartphones, etc.

Figure 2:
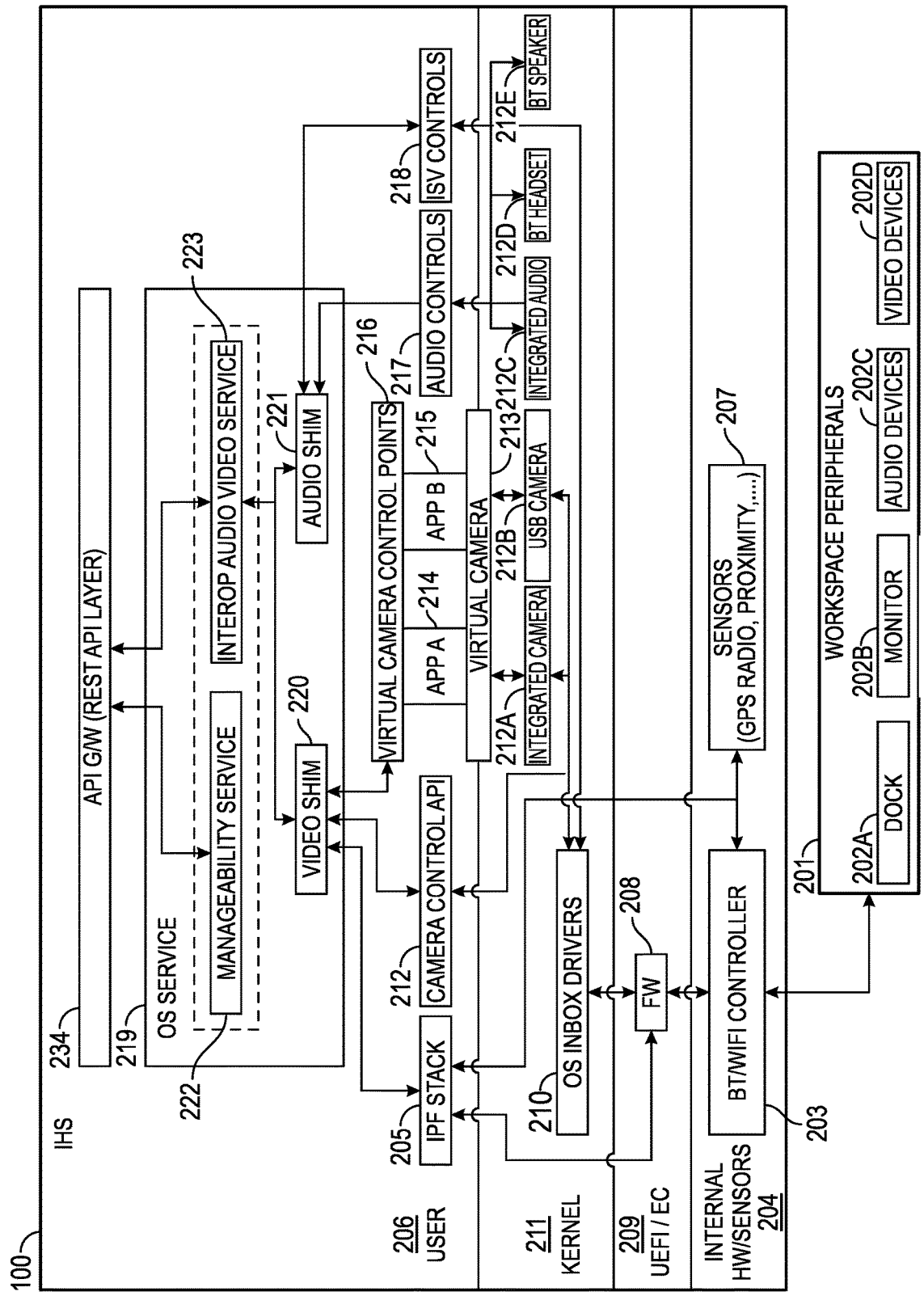
FIG. 2 depicts a block diagram of an example of a system for providing seamless switching of audio and/or video (A/V) devices for collaboration applications, according to some embodiments.

FIG. 2 depicts a block diagram of an example of a system for providing seamless switching of A/V devices for collaboration applications, according to some embodiments. Particularly, as shown in FIG. 2, IHS 100 may be disposed in a workspace (the user's home, a shared workspace, a cubicle, a desk, a conference room, a coffee shop, etc.) where physical peripheral devices 201 are available, including dock 202A, monitor 202B, audio devices 202C (e.g., USB or wireless microphone or speakers), and video devices 202D (e.g., USB or wireless webcam). In some cases, IHS 100 may be coupled to one or more peripheral devices 201 via dock 202A.

System components of IHS 100 are divided into hardware/sensor layer 204, UEFI/EC layer 209, kernel space 211, and user space 206. Particularly, BT/WiFi controller 203 of layer 204 and sensors 207 (e.g., HW sensors 110 in FIG. 1) are coupled to platform framework (IPF) stack 205 in user space 206. Firmware (FW) 208 of UEFI/EC layer 209 is coupled to BT/WiFi controller 203 in hardware/sensor layer 204, OS inbox drivers 210 in kernel space 211, and IPF stack 205 in user space 206.

OS drivers 210 are coupled to integrated camera driver 212A, USB camera driver 212B, integrated audio driver 212C, BT headset driver 212D, and BT speaker 212E. Integrated camera driver 212A and USB camera driver 212B are coupled to virtual camera engine 213 in user space 206, and integrated audio driver 212C, BT headset driver 212D, and BT speaker 212E are coupled to audio control module 217 and ISV control module 218 in user space 206.

Virtual camera engine 213 is coupled to first application 214 (e.g., ZOOM) and second application 215 (e.g., TEAMS). It should be noted, however, that any number of applications may be executed in user space 206. Each of applications 214 and 215 is coupled to virtual camera control points 216.

OS service 219 includes manageability service 222 and interop A/V service 223.

Moreover, interop A/V service 223 is coupled to video shim 220 and audio shim 221. Video shim 220 is coupled to camera control API 212 and to virtual camera control points 216. Audio shim 221 is coupled to audio control module 217 and ISV control module 218. Furthermore, manageability service 222 and interop A/V service 223 may be in communication with cloud services (not shown) via gateway Application Programming Interface (API) 234 (e.g., a representational state transfer or "REST" API).

In operation, interop A/V service 223 is configured to monitor, capture, and configure A/V devices based on a user's current context. Video shim 220 comprises a library layer configured to abstract, generalize, and/or normalize different video frameworks and/or modules, and to provide a single video configuration API. Conversely, audio shim 221 comprises a library layer configured to abstract, generalize, or normalize different audio frameworks and/or modules, and to provide a single audio configuration API. Meanwhile, gateway API 234 is responsible for exposing A/V preset configurations from the edge, and acts as a gateway for outgoing requests. Virtual camera control points 216 enable virtual camera controls for configuring audio and video settings.

Figure 3:
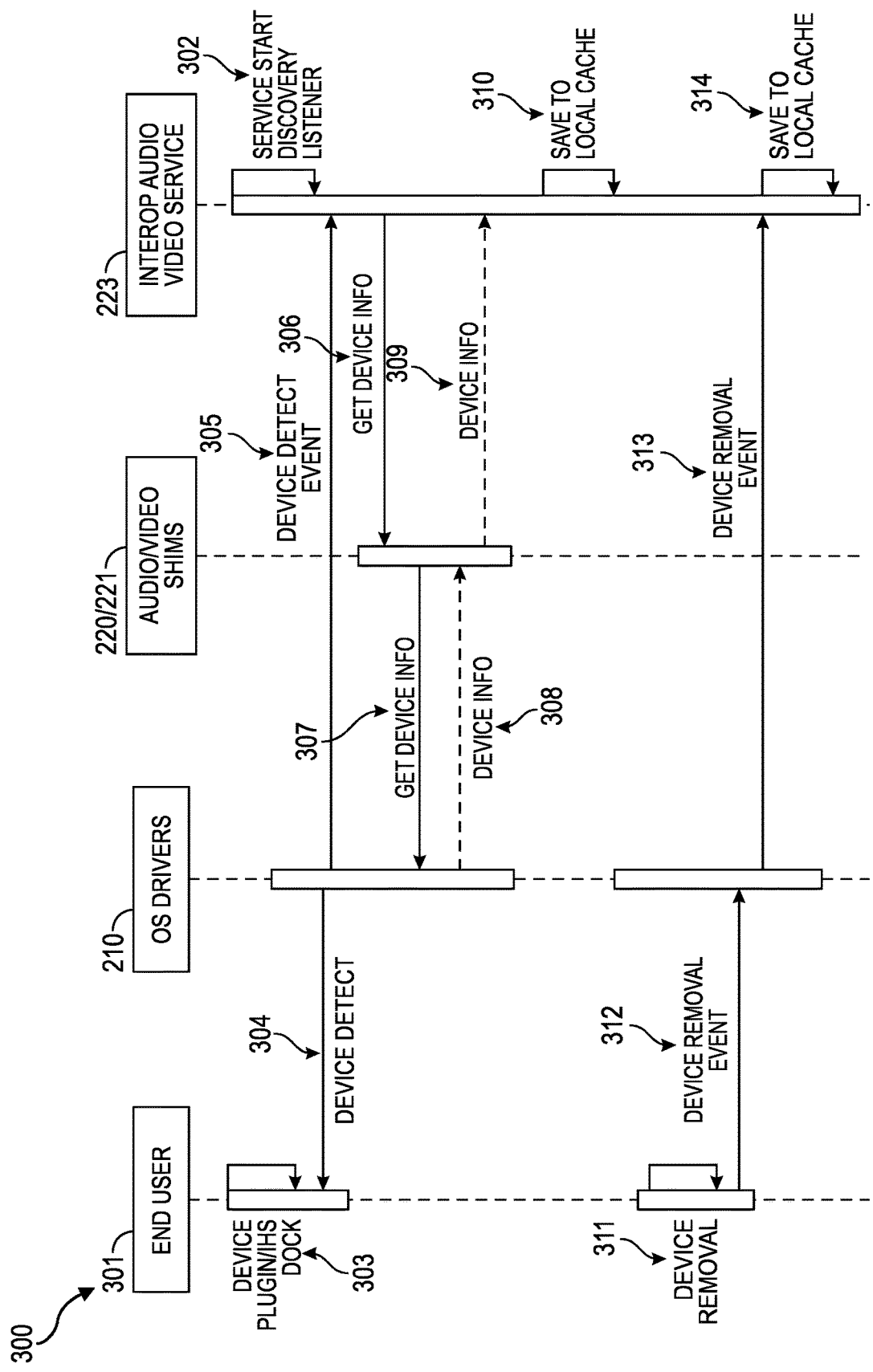
FIG. 3 depicts a sequence diagram of an example of a method for A/V device discovery and cache update, according to some embodiments.

FIG. 3 depicts a sequence diagram of an example of method 300 for A/V device discovery and cache update. In various embodiments, method 300 may be performed, at least in part, by one or more components shown in the system of FIG. 2. Particularly, at 302, interop A/V service 223 starts a discovery listening service. At 303, user 301 plugs an A/V device into IHS 100 (e.g., by plugging IHS 100 into dock 201A, wiring an external device into IHS 100, wirelessly pairing a device to IHS 100, etc.).

At 304, OS drivers 210 detect the newly added A/V device. At 305, OS drivers 210 issue a "device detect" event message to interop A/V service 223. At 306, interop A/V service 223 sends A/V shims 220/221 a "get device information" command. At 307, A/V shims 220/221 send the get device information command to OS drivers 210. At 208, OS drivers 210 send the obtained device information (e.g., vendor, Device ID, asset information, etc.) to A/V shims 220/221, and at 309 A/V shims 220/221 forward the device information to interop A/V service 223. At 310, interop A/V service 223 saves the newly added A/V device information to a local cache.

At 311, an A/V device removal event may occur (e.g., by unplugging IHS 100 from dock 201A, unplugging an external device from IHS 100, wirelessly disconnecting a device from IHS 100, suffering a power outage, reaching a low battery charge level, etc.). As such, at 312, the A/V device removal event may be detected by OS drivers 210. At 313, OS drivers 210 may send an indication of the A/V device removal event to interop A/V service 223. Then, at 314, interop A/V service 223 may update the local cache by flagging a corresponding A/V device as unavailable or by removing the device information from the cache.

Figure 4:
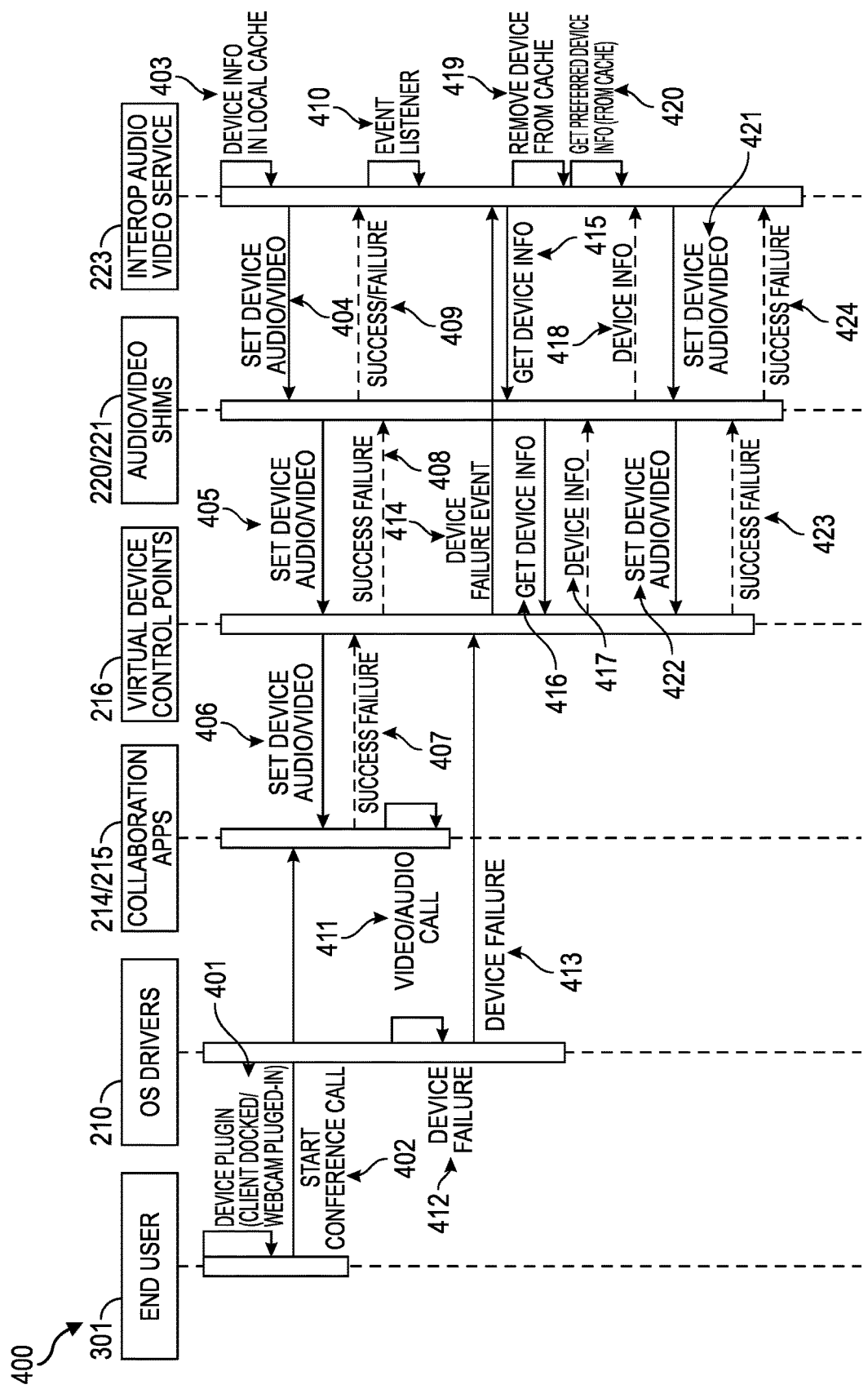
FIG. 4 depicts a sequence diagram of an example of a method for providing seamless switching of A/V devices in response to a device failure during a collaboration application session, according to some embodiments.

FIG. 4 depicts a sequence diagram of an example of method 400 for providing seamless switching of A/V devices in response to a device failure during a collaboration application session. In various embodiments, method 400 may be performed, at least in part, by one or more components shown in the system of FIG. 2. Particularly, at 401, user 301 docks IHS 100 or plugs an AV device (e.g., webcam, etc.) into IHS 100. At 402, user 301 operates collaboration application(s) 214/215 to start a collaboration session (e.g., a conference call).

Meanwhile, at 403, interop A/V service 223 maintains A/V device information collected using method 300. At 404, interop A/V service 223 sends a command to A/V shims 220/221 to set a selected A/V device for use during the session. For example, the initial A/V devices may be selected based upon context information and/or user preferences.

At 405, A/V shims 220/221 send the set device command to virtual device control points 216, and at 406 virtual device control points 216 sends the command to collaboration application(s) 214/215. Virtual device control points 216 and/or A/V shims 220/221 may enumerate and create virtual device handles for each A/V device that are usable for mapping the actual physical devices. As such, when receiving or processing audio signals or video frames, collaboration application(s) 214/215 may use generic, virtual device handles rather than referring to specific physical devices. In some cases, collaboration application(s) 214/215 may receive audio or video data from different A/V device(s) using a same virtual device handle.

At 407, collaboration application(s) 214/215 sends a success or failure indication to virtual device control points 216. At 408, virtual device control points 216 forwards the indication to A/V shims 220/221, and at 409 A/V shims 220/221 forwards the indication to interop A/V service 223. At 410, collaboration application(s) 214/215 starts the collaboration session using the set A/V devices.

As such, interop A/V service 223 sets up default A/V devices to a virtual device handle created by virtual device control points 216 and/or A/V shims 220/221. In addition, interop A/V service 223 queries AV device handles from the local cache based on the discovery and associates the most appropriate A/V devices to the virtual handle using the virtual device control points 216. At 411, interop A/V service 223 listens for failure events (e.g., due to A/V device connectivity issues, such as a loss of at least a portion of a video frame or a loss of at least a portion of an audio stream during a collaboration session).

At 412, OS drivers 210 detect a device failure (e.g., disconnect, low battery, etc.). At 413, OS drivers 210 send a device failure message to virtual device control points 216. At 414, virtual device control points 216 send the device failure event to interop A/V service 223.

Upon receiving the device failure event, interop A/V service 223 checks for the failed device information at 415 with A/V shims 220/221. At 416, A/V shims 220/221 get device information from virtual device control points 216. At 417, virtual device control points 216 return device information to A/V shims 220/221, and at 418 A/V shims 220/221 forward the device information to interop A/V service 223. At 419, interop A/V service 223 removes the failed device from the local cache or updates its status.

At 420, interop A/V service 223 gets a preferred device info from the local cache and sets the new A/V device info with A/V shims 220/221 at 421. At 422, A/V shims 220/221 send the set command to virtual device control points 216. At 423, virtual device control points 216 sends a success or failure message to A/V shims 220/221, and at 424 A/V shims 220/221 forward the message to interop A/V service 223.

As a result, if the failed A/V device has been mapped to the virtual device handle being used during the collaboration session, interop A/V service 223 disconnects the physical A/V device from the virtual device handle, and then programs or re-maps a new association of A/V device to the same virtual device handle using the virtual device control points 216's APIs, without having to notify collaboration applications 214/215 and/or in the absence of user input. In some cases, interop A/V service 223 may select a new physical A/V device to be associated with the device handle based, at least in part, upon previously selected user preferences and/or based upon contextual information.

Examples of contextual information usable by interop A/V service 223 to select a new A/V device and to re-map it to the virtual device handle may include, but are not limited to: an application type or ID (e.g., video conferencing, audio conferencing, etc.), whether the application is being executed in the foreground or background, a position or distance of the user relative to the IHS, a position or distance of the user relative to the failed or other A/V device, the user's gaze direction or face angle, a user ID, a type or importance of the collaboration session, a role of the user in the collaboration session (e.g., speaker, listener, participant, host, etc.), an IHS location, a battery charge level, an AC power availability, a utilization level of a component of the IHS (e.g., processor, memory, etc.), a temperature of the IHS, a posture of the IHS (e.g., tablet mode or laptop mode), an ambient noise level, an ambient light level, etc.

In some cases, interop A/V service 223 may notify the user of the change. At 419, if the failed A/V device is not currently mapped to the virtual device handle, interop A/V service 223 updates the device state in the local cache.

As such, systems and methods described herein enable the seamless switching of A/V devices across different collaboration applications and/or other A/V applications (whether OS-based, web apps, etc.) using a scalable architecture with an application-agnostic translation layer that detects device failures and switches to the most appropriate A/V devices, with the proper configuration, with low latency, and with little or no intrusion upon the user's experience.

These systems and methods address problems such as audio disconnect, video disconnect, call disconnect, session freeze that can otherwise plague collaboration sessions by enforcing predictable behaviors and that enable users to have seamless switching of A/V devices during their session without hampering ongoing sessions by any collaboration application. In some cases, these systems and methods may be scaled using a cloud service control point in communication with the user's IHS.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, IoT devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a processor; and
a memory coupled to the processor, the memory having program instructions stored thereon that, upon execution, cause the IHS to:
send a first command to a virtualizing service of the IHS, wherein the first command includes a reference to a first audio or video device;
create, by the virtualizing service and in response to the first command, a virtual device handle for the first audio or video device;
send a second command to a collaboration application, wherein the second command refers to the virtual device handle;
receive, during a collaboration session facilitated by the collaboration application, an indication of an event, wherein the collaboration application is configured by the second command to receive audio or video data from the first audio or video device via the virtual device handle; and
in response to the event, map a different audio or video device to the virtual device handle, including disconnecting the first audio or video device from the virtual device handle and programming a new association of the different audio or video device to the virtual device handle, wherein the collaboration application is configured to receive additional audio or video data from the different audio or video device via the virtual device handle, further wherein the virtual device handle is different from the reference to the first audio or video device and different from a reference to the different audio or video device.

2. The IHS of claim 1, wherein the collaboration application comprises an audio or video conferencing application.

3. The IHS of claim 1, wherein the first audio or video device comprises at least one of: an integrated camera or an external camera.

4. The IHS of claim 1, wherein the first audio or video device comprises at least one of: an integrated microphone, an external microphone, an integrated speaker, or an external speaker.

5. The IHS of claim 1, wherein the different audio or video device is mapped to the virtual device handle by an Operating System (OS) service external to the collaboration application.

6. The IHS of claim 5, wherein the different audio or video device is mapped to the virtual device handle in the absence of notification to the collaboration application.

7. The IHS of claim 5, wherein the different audio or video device is mapped to the virtual device handle in the absence of any user input request.

8. The IHS of claim 1, wherein the event comprises a connectivity issue between the first audio or video device and the IHS.

9. The IHS of claim 8, wherein the connectivity issue comprises a loss of at least a portion of a video frame or a loss of at least a portion of an audio stream during the collaboration session.

10. The IHS of claim 1, wherein the program instructions, upon execution, cause the IHS to select the different audio or video device based, at least in part, upon a user's preference.

11. The IHS of claim 1, wherein the event comprises an IHS docking or undocking.

12. The IHS of claim 1, wherein the event comprises a at least one of: an unplugging of the first audio or video device from the IHS or a plugging of the different audio or video device into the IHS.

13. The IHS of claim 1, wherein the event comprises a power or battery event.

14. The IHS of claim 1, wherein the event comprises a change in utilization of a component of the IHS.

15. The IHS of claim 1, wherein the event comprises at least one of: a change of location of the IHS, a change of position of a user relative to the IHS, a change of position of the user relative to the audio or video device, a change of position of the user relative to the different audio or video device, or a change in the user's gaze or face angle.

16. The IHS of claim 1, wherein the event comprises a change of a role of a user during the collaboration session.

17. A method, comprising:
sending a first command to a virtualizing service, wherein the first command includes a reference to a first audio or video device;
creating, by the virtualizing service and in response to the first command, a virtual device handle for the first audio or video device;
sending a second command to a collaboration application, wherein the second command refers to the virtual device handle;
receiving an indication of a failure of the first audio or video device during a collaboration session executed by the collaboration application, wherein the collaboration application is configured to receive audio or video data from the first audio or video device using a virtual device handle; and
in response to the failure, mapping a different audio or video device to the virtual device handle without notifying the collaboration application, including disconnecting the first audio or video device from the virtual device handle and programming a new association of the different audio or video device to the virtual device handle, wherein the collaboration application is configured to receive additional audio or video data from the different audio or video device using the virtual device handle, further wherein the virtual device handle is different from the reference to the first audio or video device and different from a reference to the different audio or video device.

18. The method of claim 17, wherein the failure comprises a loss of at least a portion of a video frame or a loss of at least a portion of an audio stream during the collaboration session.

19. A memory storage device having program instructions stored thereon that, upon execution by an Information Handling System (IHS), cause the IHS to:
send a first command to a virtualizing service of the IHS, wherein the first command includes a reference to a first audio or video device;
create, by the virtualizing service and in response to the first command, a virtual device handle for the first audio or video device;
send a second command to a collaboration application, wherein the second command refers to the virtual device handle;
receive an indication of a change of context during a collaboration session provided by the collaboration application, wherein the collaboration application is configured to receive audio or video data from a first audio or video device using a virtual device handle; and
in response to the change of context, map a different audio or video device to the virtual device handle without notification to the collaboration application, including disconnecting the first audio or video device from the virtual device handle and programming a new association of the different audio or video device to the virtual device handle, wherein the collaboration application is configured to receive additional audio or video data from the different audio or video device using the virtual device handle, further wherein the virtual device handle is different from the reference to the first audio or video device and different from a reference to the different audio or video device.

20. The memory storage device of claim 19, wherein the change of context comprises at least one of: a change of position of a user relative to the IHS, a change of position of the user relative to the first audio or video device, a change of position of the user relative to the different audio or video device, or a change in the user's gaze or face angle.

* * * * *